A. G. PICKETT, Jr.
KING-BOLT.

No. 169,728. Patented Nov. 9, 1875.

WITNESSES:
A. W. Almquist
A. F. Terry

INVENTOR:
A. G. Pickett, Jr.
BY Munn & Co
ATTORNEYS.

UNITED STATES PATENT OFFICE.

ANDREW G. PICKETT, JR., OF YUMA DEPOT, ARIZONA TERRITORY.

IMPROVEMENT IN KING-BOLTS.

Specification forming part of Letters Patent No. 169,728, dated November 9, 1875; application filed April 3, 1875.

*To all whom it may concern:*

Figure 1:
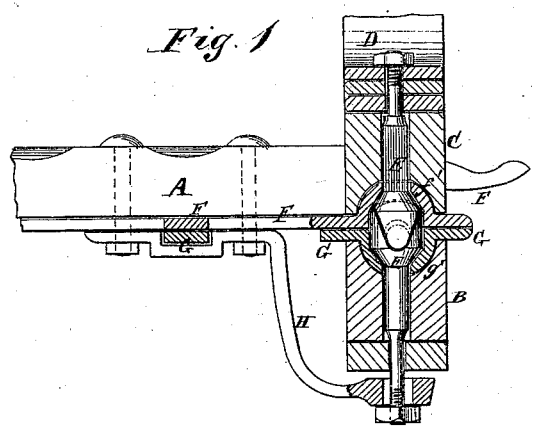
Figure 2:
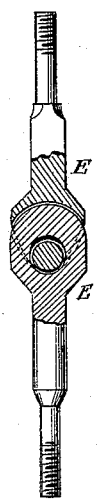
Figure 3:
Figure 4:
Figure 5:
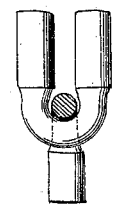

Be it known that I, ANDREW G. PICKETT, Jr., of Yuma Depot, in the county of Yuma and Territory of Arizona, have invented a new and useful Improvement in King-Bolts, &c., of which the following is a specification:

Figure 1 is a side view of my improved king-bolt, shown as applied to the running-gear of a wagon, the axle and head-block being shown in section. Fig. 2 is a detail sectional view of the king-bolt. Figs. 3, 4, and 5 are detail views, illustrating the way in which the joint is formed.

Similar letters of reference indicate corresponding parts.

The object of this invention is to furnish an improved joint for king-bolts, shafting, &c., which, when applied to king-bolts, comes where the greatest strain is, and yields to any sudden jolt, and thus prevents the bolt from being broken or bent, and also prevents the axle and the head-block or bolster from being split, rendering the vehicle safer and more durable.

The invention consists in the peculiar joint formed in a bolt or shaft, in the manner hereinafter fully described, and in the socket formed in the fifth-wheel plates to receive the joint of the bolt, as hereinafter fully described.

A represents the reach, B the axle, C the head-block or bolster, and D the spring, of a wagon. E is the king-bolt, which is made in two parts.

In forming the king-bolt two pieces of steel of the proper length and size are taken, and their middle parts are drawn down with the horn of an anvil and a fuller, as shown in Fig. 4. These bars are bent into U shape, and are interlocked with each other, as shown in Fig. 5. The ends of each bar are then welded together, and are drawn out into proper shape with fullers and swages. When first welded the joint is rigid, and the bolt is finished in the lathe, or with a file. The bolt is then reheated, and the joint is loosened as much as is necessary to give it the required play. Screw-threads are cut upon both ends of the bolt to receive nuts.

F is the upper fifth-wheel plate, which is attached to the reach A and bolster C, and G is the lower fifth-wheel plate, which is attached to the axle B. In both the plates F G, around the holes through which the bolt E passes, are formed half-round sockets $f'$ $g'$, to receive the joint of the king-bolt E, which sockets are fitted into recesses formed to receive them in the axle B and bolster C. H is a brace, the upper part of which is bolted to the reach A, and has a recess formed in it to receive the circular bar of the fifth-wheel plate G, and serves as a keeper for said bar. The brace H is made of spring-steel, and its lower end projects a little below the axle B, and has a hole formed through it to receive the lower end of the bolt E, where it is held in place by the nut screwed upon the lower end of the said bolt E, the spring of the brace H holding its lower end always pressed against the said nut. The hole through the lower end of the spring-brace H is made enough larger than the end of the bolt E to allow the said bolt and the axle B to have the necessary play.

This joint may also be employed with other bolts, and with shafts, with the same advantage as when applied to king-bolts.

I do not claim a jointed king-bolt; but,

Having thus described my invention, I claim as new and desire to secure by Letters Patent—

1. The combination, with the axle B and bolster C, of the king-bolt E, composed of two parts, having U-shaped eyes, forming universal joint, all substantially as and for the purpose set forth.

2. The combination, with the axle B, bolster C, and king-bolt E, of the friction-plates F G, having rounded sockets, all substantially as set forth.

ANDREW G. PICKETT, JR.

Witnesses:
C. H. KIMLEY,
H. GOLDBERG.